United States Patent
Kitora

(10) Patent No.: US 8,810,827 B2
(45) Date of Patent: Aug. 19, 2014

(54) IMAGE PROCESSING APPARATUS, IMAGE PROCESSING METHOD, AND STORAGE MEDIUM

(75) Inventor: Masakazu Kitora, Kawasaki (JP)

(73) Assignee: Canon Kabushiki Kaisha (JP)

( * ) Notice: Subject to any disclaimer, the term of this patent is extended or adjusted under 35 U.S.C. 154(b) by 1618 days.

(21) Appl. No.: 12/333,705

(22) Filed: Dec. 12, 2008

(65) Prior Publication Data

US 2009/0153893 A1 Jun. 18, 2009

(30) Foreign Application Priority Data

Dec. 14, 2007 (JP) ................................ 2007-323360

(51) Int. Cl.
*G06F 3/12* (2006.01)
*H04N 1/32* (2006.01)
*H04N 1/00* (2006.01)

(52) U.S. Cl.
CPC ........ *H04N 1/32128* (2013.01); *H04N 1/00222* (2013.01); *H04N 2201/3278* (2013.01); *H04N 1/00233* (2013.01); *H04N 2201/3276* (2013.01); *H04N 2201/0094* (2013.01); *H04N 2201/3242* (2013.01)
USPC ........... 358/1.15; 358/1.13; 358/1.2; 382/176

(58) Field of Classification Search
USPC .......... 358/1.13, 1.15, 1.18; 710/15; 382/162, 382/305, 176
See application file for complete search history.

(56) References Cited

U.S. PATENT DOCUMENTS

| | | | |
|---|---|---|---|
| 6,771,387 B2* | 8/2004 | Gauthier | 358/1.15 |
| 7,084,998 B2* | 8/2006 | Blair et al. | 358/1.15 |
| 7,173,731 B2* | 2/2007 | Tanaka | 358/1.16 |
| 7,684,074 B2* | 3/2010 | Reddy et al. | 358/1.15 |
| 7,903,307 B2* | 3/2011 | Dai et al. | 358/540 |
| 7,933,447 B2 | 4/2011 | Yamazaki | |
| 8,010,516 B2 | 8/2011 | Ishii et al. | |
| 8,154,755 B2* | 4/2012 | Roncal | 358/1.15 |
| 8,174,712 B2* | 5/2012 | Richardson et al. | 358/1.15 |
| 8,179,560 B2* | 5/2012 | Hino | 358/1.2 |
| 2005/0174593 A1* | 8/2005 | Piersol et al. | 358/1.13 |
| 2006/0008113 A1 | 1/2006 | Matsukubo et al. | |
| 2007/0033212 A1* | 2/2007 | Fifield et al. | 707/102 |
| 2007/0047814 A1* | 3/2007 | Yamazaki | 382/176 |
| 2007/0171473 A1* | 7/2007 | Iwasaki | 358/1.18 |
| 2007/0229866 A1* | 10/2007 | Dai et al. | 358/1.9 |
| 2008/0079985 A1* | 4/2008 | Ferlitsch | 358/1.15 |

FOREIGN PATENT DOCUMENTS

| | | |
|---|---|---|
| JP | 5-342408 A | 12/1993 |
| JP | 2005-346494 A | 12/2005 |
| JP | 2006025129 A | 1/2006 |
| JP | 2007-166541 A | 6/2007 |
| JP | 2007-188448 A | 7/2007 |
| JP | 2007-200014 A | 8/2007 |

OTHER PUBLICATIONS

Office Action Issued in Japanese Patent Application 2007-323360 dated Feb. 21, 2012.

* cited by examiner

*Primary Examiner* — Ashish K Thomas
(74) *Attorney, Agent, or Firm* — Rossi, Kimms & McDowell LLP

(57) ABSTRACT

An image processing apparatus which is capable of preventing wasteful transmission of metadata. Metadata is registered in advance in association with a type of a transmission destination of an image data. When transmitting the image data, metadata associated with the type of the transmission destination of the image data is determined, and the image data and the determined metadata are transmitted to the transmission destination.

9 Claims, 8 Drawing Sheets

IMAGE PROCESSING APPARATUS, IMAGE PROCESSING METHOD, AND STORAGE MEDIUM

BACKGROUND OF THE INVENTION

1. Field of the Invention

The present invention relates to an image processing apparatus, an image processing method, and a program, and more particularly to an image processing apparatus which is capable of processing metadata, an image processing method therefor, and a storage medium for storing a program for implementing the image processing method.

2. Description of the Related Art

Recently, there has been proposed a digital multifunction peripheral (MFP) provided with a function of reading a rasterized image by a scanner, classifying the read rasterized image into objects, such as text objects and graphic objects, filing the objects, and reusing the filed objects (see e.g. Japanese Patent Laid-Open Publication No. H05-342408).

Further, a technique has been proposed in which metadata (attached information on data) is attached to image data so as to make it possible to carry out processing accurately reflecting the properties of image data (see e.g. Japanese Patent Laid-Open Publication No. 2006-025129). This technique enables an application to optimally process desired image data using metadata attached to the image data.

However, in the technique disclosed in Japanese Patent Laid-Open Publications No. 2006-025129, whenever image data is transmitted for use by an application, metadata as well is sent to the application in a state attached to the image data. Necessary metadata differs from application to application, and hence metadata useful for one application may not be necessitated by another. Therefore, if data is always transmitted within a system, with all metadata attached thereto, it is considered that useless information is sometimes wastefully transmitted, which causes an increase in the amount of transmitted data and resultant delay in transmission processing.

SUMMARY OF THE INVENTION

The present invention provides an image processing apparatus which is capable of preventing wasteful transmission of metadata, an image processing method therefor, and a storage medium for storing a program for implementing the image processing method.

In a first aspect of the present invention, there is provided an image processing apparatus comprising an acquisition unit adapted to acquire image data, a generation unit adapted to generate metadata for the image data, a registration unit adapted to register an output destination to which the generated metadata is to be output, and an output unit adapted to output the image data to the output destination, wherein the output unit outputs the metadata only when the image data is output to the registered output destination.

In a second aspect of the present invention, there is provided an image processing method for controlling an image processing apparatus, comprising acquiring image data, generating metadata for the image data, registering an output destination to which the generated metadata is to be output, and outputting the image data to the output destination, wherein the outputting includes outputting the metadata only when the image data is output to the registered output destination.

In a third aspect of the present invention, there is provided a storage medium storing a program for causing a computer to execute an image processing method for controlling an image processing apparatus, wherein the image processing method comprises acquiring image data, generating metadata for the image data, registering an output destination to which the generated metadata is to be output, and outputting the image data to the output destination, wherein the outputting includes outputting the metadata only when the image data is output to the registered output destination.

In a fourth aspect of the present invention, there is provided an image processing apparatus comprising a registration unit adapted to generate a plurality of metadata items for image data, and register the plurality of generated metadata items each in association with information on a transmission destination type, a determination unit adapted to determine, when transmitting the image data stored in a storage to a transmission destination, a metadata item which is associated with the type of the transmission destination, from the plurality of generated metadata items, and a transmission unit adapted to transmit the image data and the determined metadata to the transmission destination.

In a fifth aspect of the present invention, there is provided an image processing method comprising a registration step of generating a plurality of metadata items for image data, and registering the plurality of generated metadata items each in association with information on a transmission destination type, a determination step of determining, when transmitting the image data stored in a storage to a transmission destination, a metadata item which is associated with the type of the transmission destination, from the plurality of generated metadata items, and a transmission step of transmitting the image data and the determined metadata to the transmission destination.

In a sixth aspect of the present invention, there is provided a computer-readable storage medium storing a computer program, wherein the computer program causes a computer to execute a registration step of generating a plurality of metadata items for image data, and registering the plurality of generated metadata items each in association with information on a transmission destination type, a determination step of determining, when transmitting the image data stored in a storage to a transmission destination, a metadata item which is associated with the type of the transmission destination, from the plurality of generated metadata items, and a transmission step of transmitting the image data and the determined metadata to the transmission destination.

According to the present invention, output destinations (e.g. application-specific ones) for respective generated metadata items are registered in advance, and metadata transmission to an application is performed such that only a metadata item suitable for the application is output. Therefore, it is possible to prevent wasteful transmission of metadata.

The features and advantages of the invention will become more apparent from the following detailed description taken in conjunction with the accompanying drawings.

DETAILED DESCRIPTION OF THE EMBODIMENTS

The present invention will now be described in detail below with reference to the accompanying drawings showing embodiments thereof.

Figure 1:
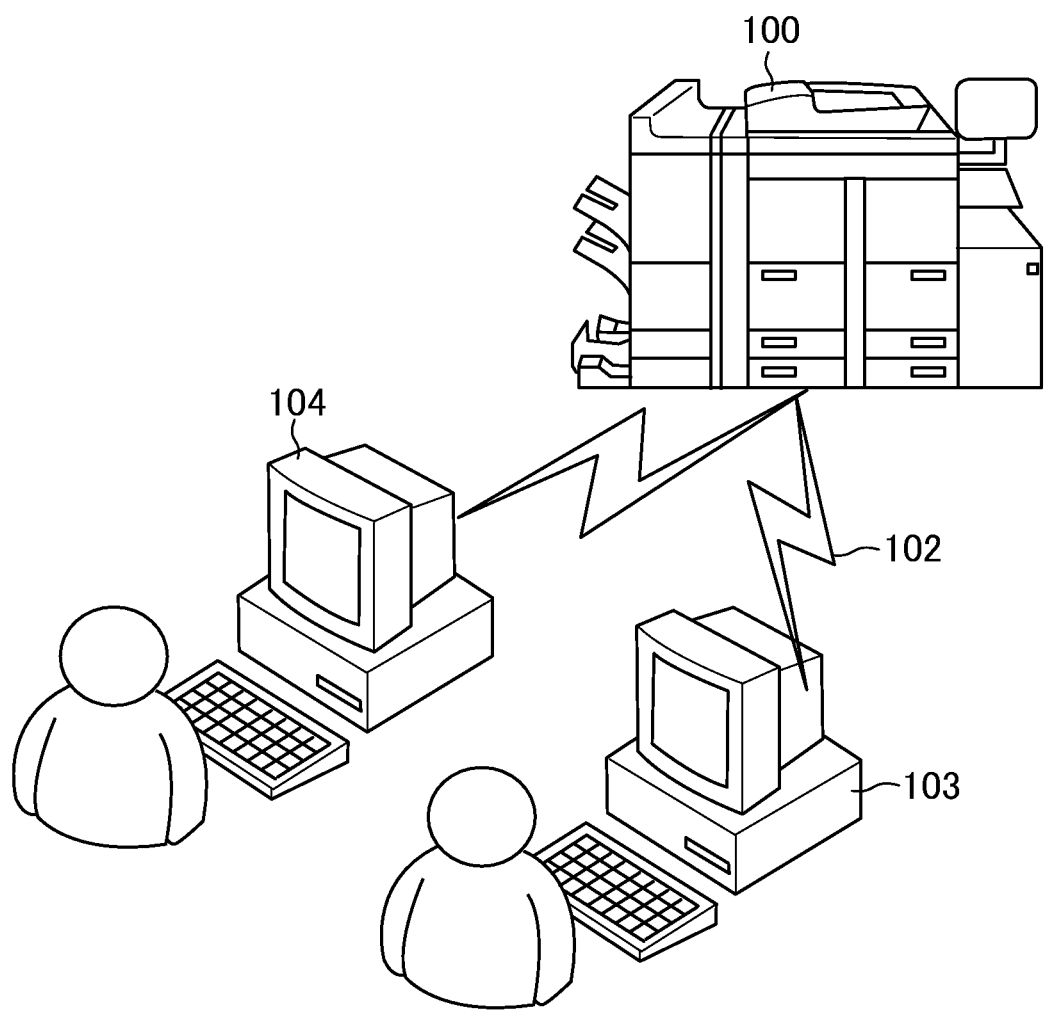
FIG. 1 is a diagram of an image processing system including an image processing apparatus according to an embodiment of the present invention.

FIG. 1 is a diagram of an image processing system including an image processing apparatus according to the embodiment of the present invention.

As shown in FIG. 1, the image processing system is comprised of a digital multifunction peripheral (hereinafter referred to as "the MFP") 100 as an image processing apparatus, external apparatuses 103 and 104. The MFP 100 is connected to the external apparatuses 103 and 104 via a network 102. It should be noted that the number of external apparatuses included in the image processing system is not limited to two, but any number of apparatuses may be connected to the network 102 as external apparatuses.

Figure 2:
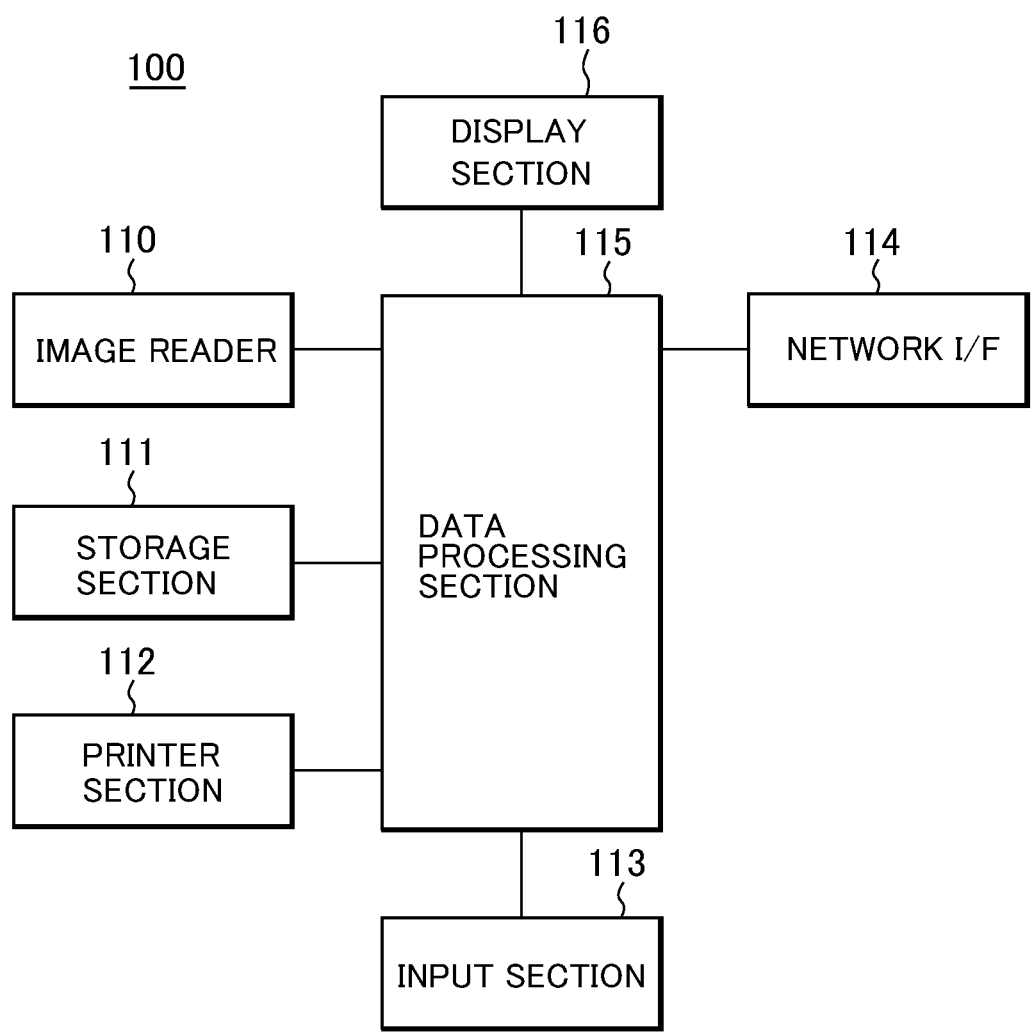
FIG. 2 is a block diagram of the internal configuration of an MFP appearing in FIG. 1.

FIG. 2 is a block diagram showing the internal configuration of the MFP 100 appearing in FIG. 1.

As shown in FIG. 2, the MFP 100 is comprised of an image reader 110, a storage section 111, a printer section 112, an input section 113, a network interface 114, a data processing section 115, and a display section 116.

The image reader 110 is provided with an auto document feeder (ADF). The image reader 110 irradiates an image on each sheet of a bundle of sheet originals or on a single sheet original fed by the auto document feeder, with light from a light source, not shown, and causes reflected light from the sheet original to form an image on a solid-state image pickup device, using lenses, not shown. Further, the image reader 110 acquires a rasterized image reading signal as image information (raster image data) with a predetermined resolution (of e.g. 600 DPI) from the solid-state image pickup device having the image formed thereon.

The MFP 100 has a copy function for printing an image corresponding to the image reading signal on a recording medium in the printer section 112. In the case of copying one original image, the data processing section 115 carries out image processing on the image reading signal to thereby generate a recording signal, and then the printer section 112 performs printing using the recording signal generated by the data processing section 115, on the recording medium. On the other hand, in the case of copying a plurality of original images, recording signals sequentially generated from the respective original images by the data processing section 115 are sequentially stored in the storage medium 111, and then the recording signals stored in the storage medium 111 are sequentially output to the printer section 112. The printer section 112 performs printing on recording media sequentially using the recording signals.

The data processing section 115 analyzes the characteristics of each image reading signal acquired by the image reader 110 (e.g. through a character recognition process and an image analysis process) and then generates metadata based on the results of the analysis. Further, the data processing section 115 converts the image reading signal acquired by the image reader 110 into an image file in a compressed image file format, such as the TIFF format or the JPEG format, or in a vector data file format, such as the PDF format, to thereby acquire image data. Then, the data processing section 115 attaches the metadata to the image data to generate meta image data. It should be noted that in the present embodiment, image data having metadata attached thereto is referred to as meta image data.

In the case of sending the meta image data as a file to the external apparatus 103 or 104, the data processing section 115 outputs the generated meta image data to the external apparatus 103 or 104 via the network interface 114 and the network 102.

Further, the data processing section 115 receives print data output from the external apparatus 103 or 104, via the network interface 114. The data processing section 115 converts the received print data into raster data printable by the printer section 112, followed by causing the printer section 112 to print the raster data on a recording medium.

An operator inputs an instruction to the MFP 100 using the input section 113 comprised of a key operating section and a touch panel, and the display section 116. The input by the operator is controlled by a controller (not shown) provided in the data processing section 115. The status of the input by the operator and image data being currently processed are displayed on the display section 116.

The storage section 111 is implemented e.g. by a large-capacity hard disk. The storage section 111 forms a database that stores and manages image data read by the image reader unit 110, meta image data generated by the data processing section 115, and image data sent from the external apparatuses 103 and 104.

Figure 3:
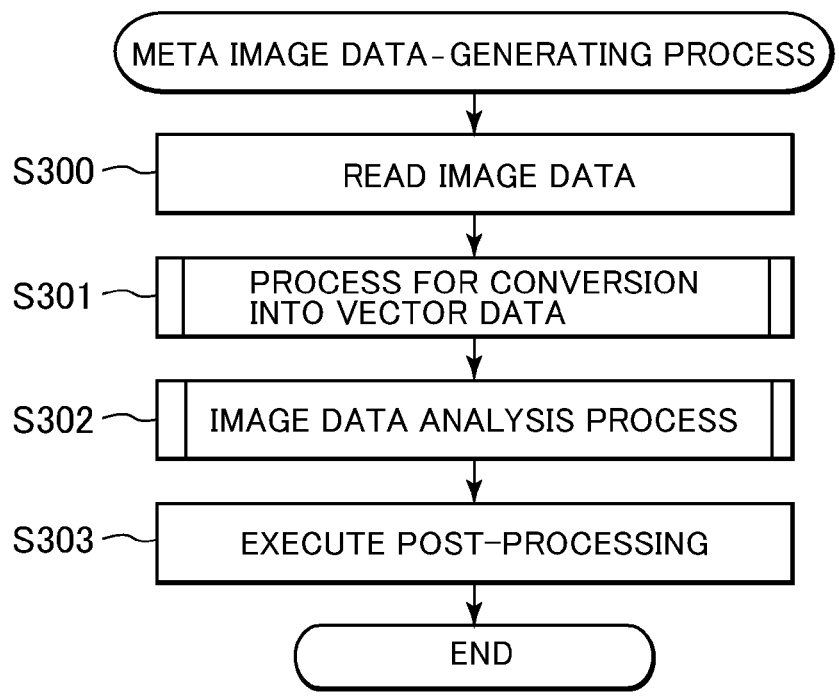
FIG. 3 is a flowchart of a meta image data-generating process executed by the MFP in FIG. 2.

FIG. 3 is a flowchart of a meta image data-generating process executed by the MFP 100 in FIG. 2.

In the meta image data-generating process, image data is read from an original by the image reader unit 110, and a vector data forming process and an image data analysis process are carried out on the read image data, to thereby generate meta image data.

Referring to FIG. 3, the image reader unit 110 reads image data from an original according to an instruction input by the operator via the input section 113 (step S300). Specifically, the image reader unit 110 raster-scans each sheet original and acquires e.g. a 600 DPI 8-bit image reading signal. The data processing section 115 carries out pre-processing on the image reading signal and then stores the processed image reading signal as image data for one page in the storage section 111.

Next, a CPU (not shown) provided in the data processing section 115 executes the process for conversion into vector data, described hereinafter with reference to FIG. 4, on the image data stored in the storage section 111 (step S301). In the process for conversion into vector data, the data processing section 115 divides the image data into objects, and converts each divided object into vector data to thereby generate a vector data file.

Then, the data processing section 115 executes the image data analysis process, described hereinafter with reference to FIG. 5, on the image data subjected to the process for conversion into vector data i.e. the vector data file (step S302). In the image data analysis process, the data processing section 115 analyzes the image data (vector data) and then generates metadata based on the results of the analysis. Further, the data processing section 115 stores the generated metadata in association with the vector data to generate meta image data.

Next, post-processing is carried out on the generated meta image data (step S303), followed by terminating the present process. For example, in the case of post-processing for copying, the data processing section 115 performs image processing including color processing and spatial frequency correction, which is best suited for each object, and the printer unit 112 prints the processed data. In the case of post-processing for file storage, the data processing section 115 stores the generated vector data in the storage section 111. Further, in the case of post-processing for file transmission, the data processing section 115 generates a file having a meta image data format formed by attaching the metadata to the vector data file, and sends the file to a file transmission destination (e.g. the external apparatus 103) via the network interface 114. In this case, only metadata of a type or types suited to the file transmission destination (i.e. metadata of a type or types necessitated by the file transmission destination) is transmitted.

Figure 4:
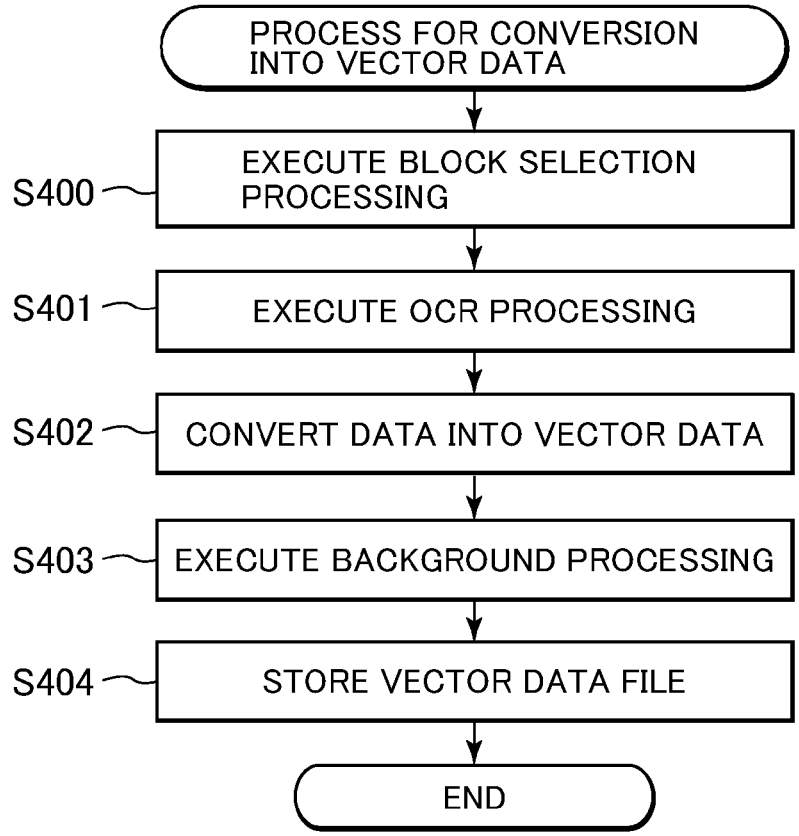
FIG. 4 is a flowchart of a process for conversion into vector data, which is executed in a step S301 in FIG. 3.

FIG. 4 is a flowchart of the process for conversion into vector data executed in the step S301 in FIG. 3.

Referring to FIG. 4, the data processing section 115 carries out block selection processing (dividing-into-regions processing) (step S400) to divide the image data into objects which are in the form of so-called block-shaped regions independent of each other. Specifically, the image data stored in the storage section 111 for processing is divided into the regions of a character/line portion and a halftone image portion. Further, the character/line portion is divided into blocks formed by respective chunks of paragraphs, and tables and graphics formed by lines. On the other hand, the halftone image portion is divided into image portions, background portions, etc., as respective separate rectangular blocks. By execution of this dividing-into-regions processing, the image data is divided into regions according to attributes thereof.

In the present embodiment, it is assumed that objects are classified into the categories of text (character) objects, graphic (thin line/graphic) objects, table objects, image objects (natural images), and background objects. It should be noted that the categories of objects are not limited to these, but any other category may be used according to a use or a purpose. Further, it is not necessary to use all the above-mentioned categories of objects.

Next, the data processing section 115 carries out OCR processing on text objects obtained by the block selection processing in the step S400 (step S401).

Then, the data processing section 115 carries out process for converting each object obtained by the block selection processing in the step S400 into vector data (step S402). For example, as for a text object subjected to the OCR processing, the data processing section 115 recognizes and identifies the character code, character size, and font of each character to thereby convert the text object into font data visually faithful to the character obtained by scanning the original. A graphic object is converted into an outlined/function-approximated function. An image object is subjected to low compression (e.g. low JPEG compression) with its reading resolution of the image reader unit 110 held at 600 DPI so as to be converted into an individual JPEG file as image data. As for a table object, numeral information items in the table object are converted into font data, and a table portion is converted into an outlined/function-approximated function. The numeral information items are associated with each other as cell information, and the cell information is encoded as a table object.

Although in the present embodiment, the text object is expressed as vector data, using character codes, character sizes, fonts, etc., recognized by character recognition, this is not limitative. For example, vector data may be generated by carrying out outlining processing and function approximation on the contour of the text object, as in the case of processing a graphic object, and the vector data thus obtained may be used e.g. for printing.

Next, the data processing section 115 carries out background processing on the background objects (step S403). In the background processing, histograms of the respective RGB colors are generated for an image associated with each background object, and when it is determined based on the histograms that a background object is data uniform in color distribution, the background object is converted into vector data indicating a rectangular region and color information (e.g. average color) indicating the color, and is stored. On the other hand, when it is determined that a background object is data non-uniform in color distribution, the resolution of the background object is converted from 600 DPI to a low resolution (e.g. 300 DPI), and then the background object is subjected to high compression (e.g. high JPEG compression), and is stored.

It should be noted that compression performed at a higher compression rate than a predetermined compression rate (e.g. 50%), for example, is defined as high compression, while compression performed at a lower compression rate than the predetermined compression rate, for example, is defined as low compression.

Next, layout information and attribute information associated with each object are stored in the storage section 111 as a vector data file (step S404), followed by terminating the present process.

The vector data file obtained by the above-described process contains all vector information in a state visually very close to the read original image, in an editable form, and the vector information can be directly processed, reused, accumulated, transmitted, or reprinted.

Figure 5:
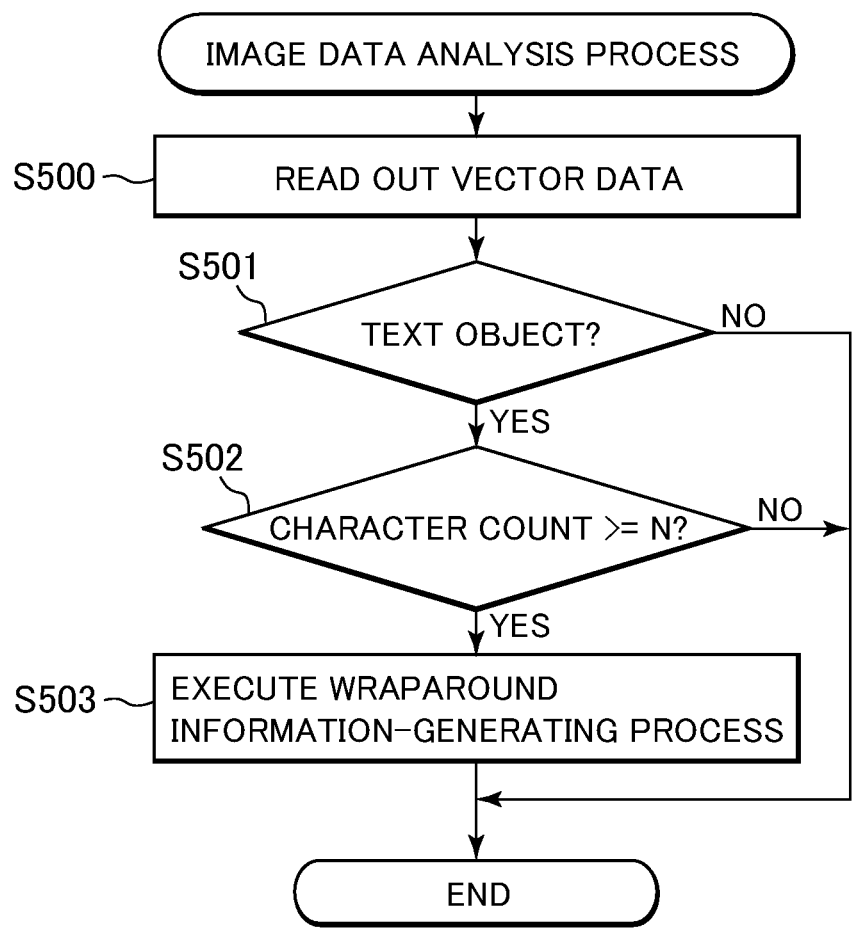
FIG. 5 is a flowchart of an image data analysis process executed in a step S302 in FIG. 3.

FIG. 5 is a flowchart of the image data analysis process executed in the step S302 in FIG. 3.

As shown in FIG. 5, first, vector data associated with each object is read out from the vector data file stored in the storage section 111 (step S500).

Next, it is determined whether or not the read-out vector data is vector data of a text object (step S501). If the read-out vector data is vector data of a text object, the process proceeds to a step S502. In the present embodiment, by carrying out processing, described hereinbelow, character strings are not only stored but also wraparound information on the character strings, which is necessitated by the application, is generated and stored as metadata. It should be noted that if it is determined in the step S501 that the read-out vector data does not contain vector data of a text object, the present process is immediately terminated.

In the step S502, the number of characters in the text object is counted, and it is determined whether the number of characters is not smaller than a predetermined value N set by the CPU provided in the data processing section 115. If it is determined that the number of characters is not smaller than the predetermined value N, the process proceeds to a step S503. On the other hand, if the number of characters is smaller than the predetermined value N, the present process is immediately terminated.

In the step S503, a wraparound information-generating process is executed, followed by terminating the present process. Specifically, wraparound information is generated as metadata for the text object, and the generated wraparound information is stored in association with the text object.

Wraparound information is for controlling text layout in a case where a text object is reused e.g. by the external apparatus 103. Wraparound information is boundary information indicative of a boundary where a new line is started or where a text object is divided into two text boxes. This boundary information may simply be the number of characters enabling uniform distribution of all characters, or alternatively, may be configured to be the number of characters which indicates the position of a boundary between specific characters recognized by OCR processing (e.g. a boundary between a kanji character string and a numeral string, a boundary between a full-size character string and a half-size character string, or a boundary between different character types).

Figure 6:
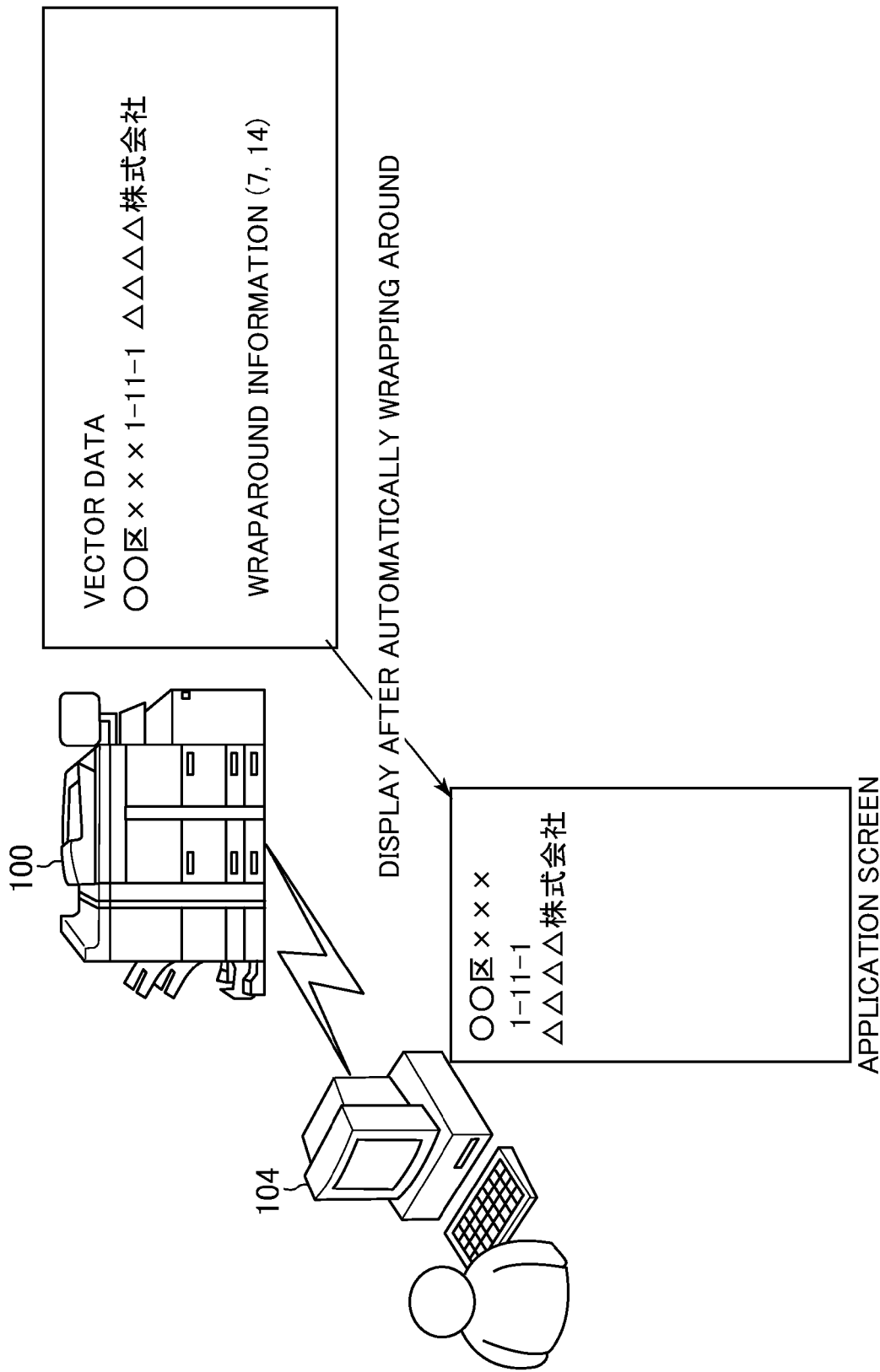
FIG. 6 is a diagram useful in explaining a wraparound information-generating process executed in a step S503 in FIG. 5.

FIG. 6 is a diagram useful in explaining the wraparound information-generating process executed in the step S503 in FIG. 5.

In FIG. 6, in the MFP 100, the numbers 7 and 14 of characters each indicative of a boundary between a numeral string and a kanji character string included in a character string representing an address in Japanese are set as wraparound information, and meta image data is generated by attaching the wraparound information as metadata to the text object. Further, the MFP 100 transmits this meta image data as a file to the external apparatus 104.

In some type of application of the external apparatus 104 having received meta image data transmitted from the MFP 100, it is sometimes desired to display a character string in a state having wrapped around. In such an application, the text object is displayed with its character string automatically wrapping around based on the number of characters attached as wraparound information indicating a boundary for breaking the character string. This makes it possible to display the text object in a manner easy to be viewed by the operator.

Figure 7:
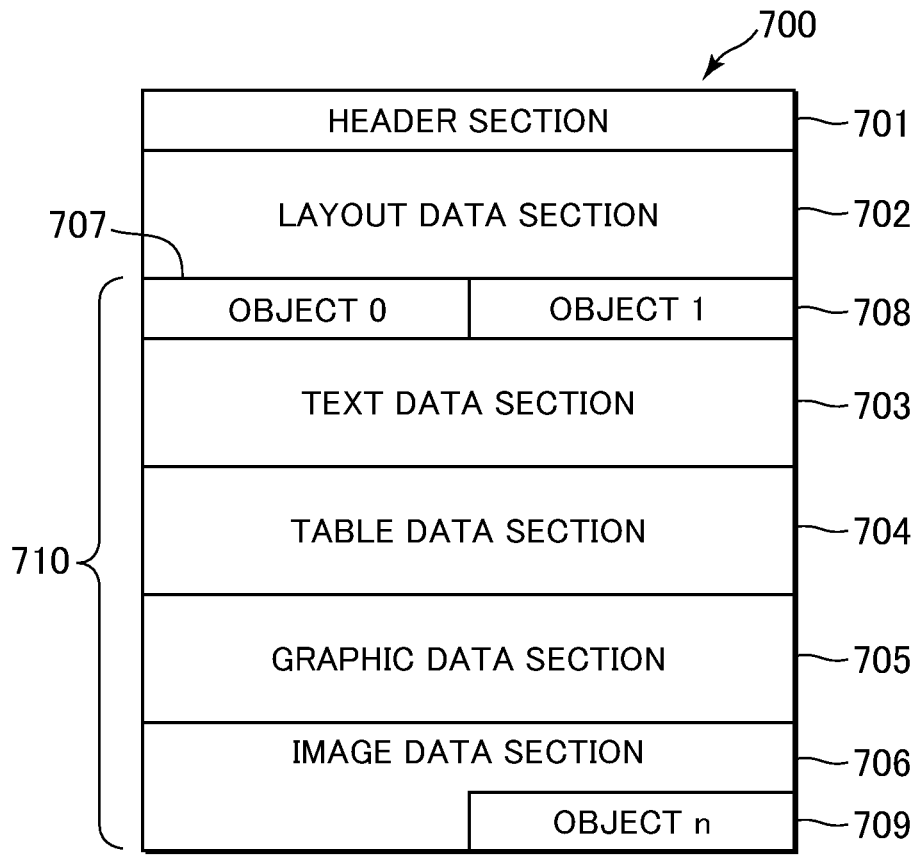
FIG. 7 is a diagram of an example of the structure of a meta image data file generated by the meta image data-generating process in FIG. 3.

FIG. 7 is a diagram of the structure of a file of meta image data generated by the meta image data-generating process in FIG. 3.

As shown in FIG. 7, the meta image data 700 is comprised of a header section 701, a layout data section 702, and an image data section 710.

The header section 701 stores information for identifying the components of the meta image data 700.

The layout data section 702 stores attribute information associated with each of objects, such as text objects, image objects, and table objects, in the original image, and layout information as rectangular address information indicative of positions where the respective objects are disposed.

The image data section 710 is comprised of a text data section 703, a table data section 704, a graphic data section 705, and an image data section 706. The image data section 710 stores image data subjected to the process for conversion into vector data, in which an object 0 (707) and objects 1 (708) to n (709) are sequentially stored in respective associated ones of data sections on an object type-by-object type basis. For example, the object 0 (707) is a text object, and hence it is stored in the text data section 703.

Figure 8:
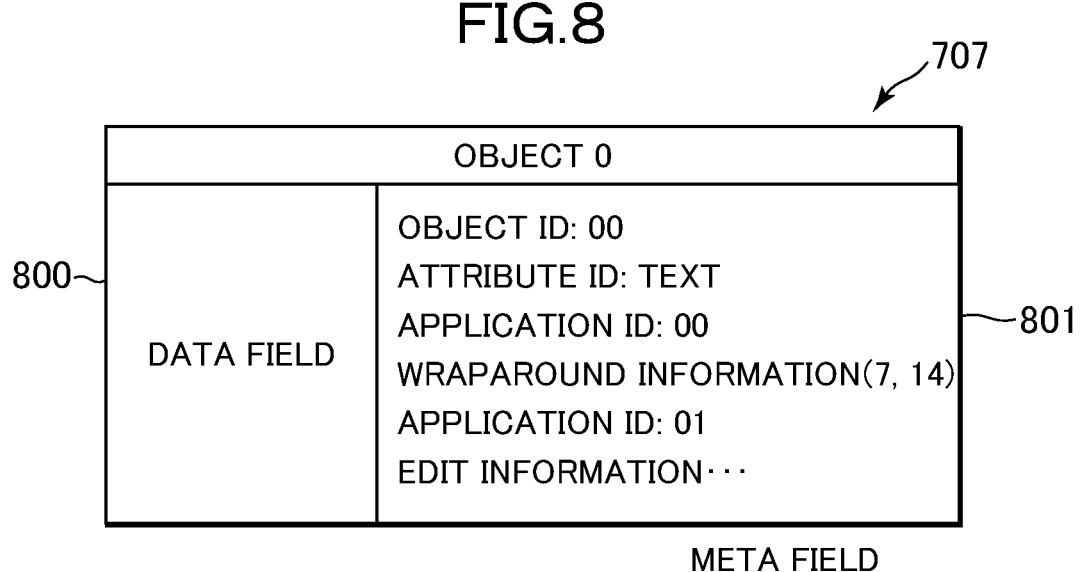
FIG. 8 is a diagram of an example of the structure of an object 0 appearing in FIG. 7.

FIG. 8 is a diagram of the structure of the object appearing in FIG. 7.

As shown in FIG. 8, the object (object 0 (707) in the illustrated example) is comprised of a data field 800 and a meta field 801.

The data field 800 stores information representative of the entity of the object 0. The data field of a text object stores results of character recognition performed for recognition of characters in the text object.

The meta field 801 stores an object ID, an attribute ID indicative of the attribute of the object, application IDs for which associated metadata items are valid, and the metadata items to be applied to respective applications (i.e. metadata items necessitated by the respective applications). The metadata items are information associated with the object 0 (707), such as wraparound information and edit information.

It should be noted that data fields of respective objects other than the text objects store, for example, the following information: The data field of a table object stores information on details of the structure of the table object. The data field of a graphic object stores information of outline data of the graphic object. The data field of an image object stores the image object cut out from image data.

Figure 9:
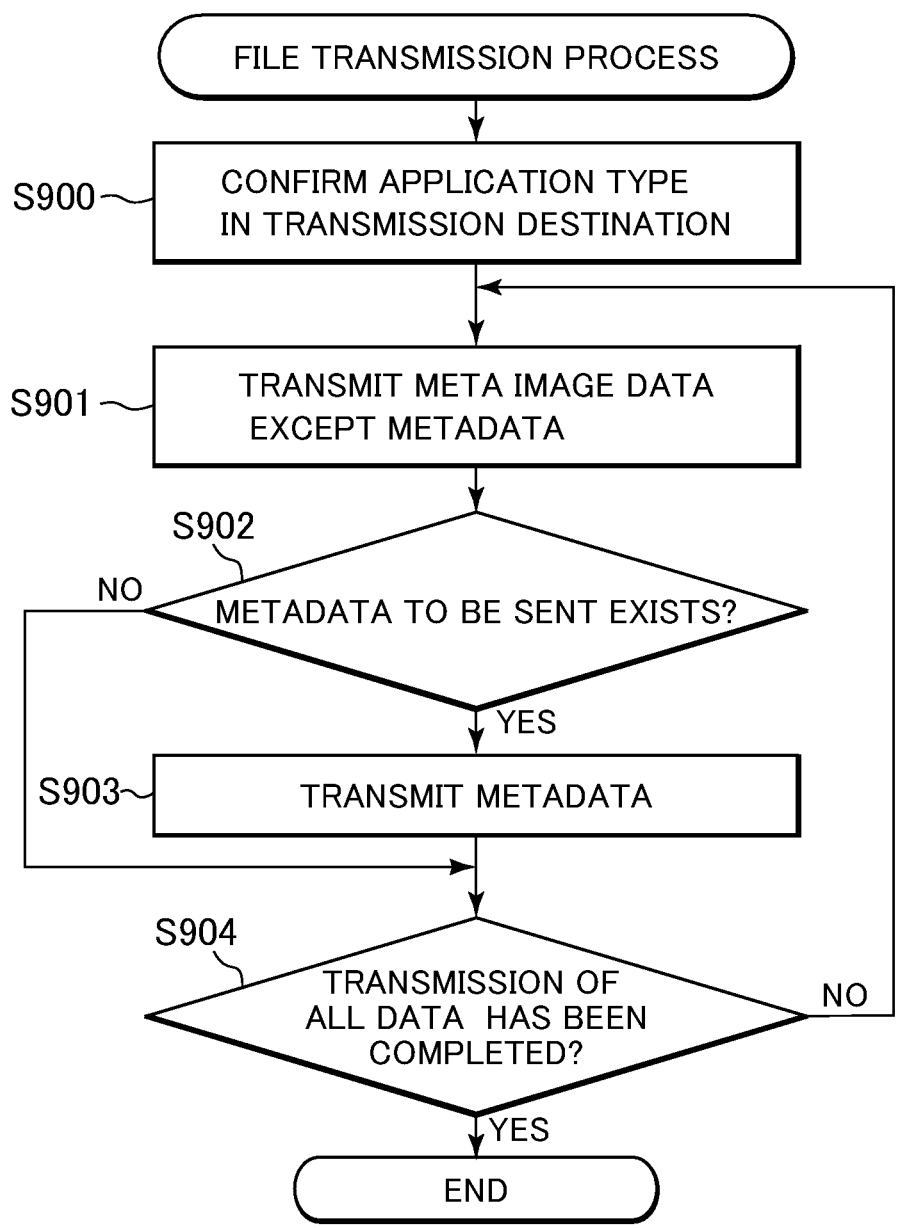
FIG. 9 is a flowchart of a file transmission process executed by the MFP in FIG. 2.

FIG. 9 is a flowchart of a file transmission process executed by the MFP 100 in FIG. 2 in the step S303 in FIG. 3.

As shown in FIG. 9, first, the CPU provided in the data processing section 115 communicates with a transmission destination (e.g. the external apparatus 103) via the network interface 114 to confirm an application type or application types in the transmission destination (step S900). For example, application types are classified into the following categories, and each application type is assigned an ID for identification by the MFP 100.

00: document input application
01: graphics drawing application
10: spreadsheet application
11: others Then, the meta image data except the metadata is sent to the transmission destination via the network interface 114 (step S901). Specifically, the data processing section 115 reads out the meta image data file from the storage section 111 and transmits the data via the network interface 114 over the network sequentially starting from the header section 701 up to the data field 800 of the object 0 (707) of the image data section 710.

Next, it is determined whether or not the object being processed for transmission (the object 0 in the present case) has metadata to be sent to any of the applications in the transmission destination (step S902). Specifically, the data processing section 115 determines whether there is any metadata stored in the meta field 801 of the object being processed for transmission, together with an ID associated with any of the application types confirmed in the step S900.

If it is determined in the step S902 that the object being processed for transmission has any metadata to be sent to any of the applications of the transmission destination, the process proceeds to a step S903. On the other hand, if the object has no metadata to be sent to any of the applications of the transmission destination, it means that all the metadata, if any, of the object being processed for transmission has been transmitted, and hence the process proceeds to a step 904.

In the step S903, the data processing section 115 extracts the metadata to be sent to the application of the transmission destination and sends the metadata to the transmission destination, and then the process proceeds to the step S904.

In the step S904, it is determined whether or not transmission of all the objects of the image data section 710 has been completed. If the transmission has not been completed, the process returns to the step S900 to start processing for transmitting the next object. On the other hand, if transmission of all the objects has been completed, the present process is immediately terminated. Determination as to whether or not transmission of all the objects has been completed may be made by a method in which the number of objects in the image data section 710 is stored in the header section 701 in advance and it is determined whether or not the number of transmitted objects has reached the stored number of objects. Alternatively, a method may be employed in which a special data pattern is set and disposed at the end of the meta image data file in advance, and it is determined whether or not the special data pattern has been reached.

According to the process in FIG. 9, the MFP 100 sends, for example, wraparound information to the document input application, which is assigned the application ID 00, of a transmission destination. The application of the transmission destination can provide easy-to-view display of a text object by starting new lines in the text object based on the received wraparound information.

Further, since the MFP 100 does not send wraparound information to an application, such as a graphics drawing application, which does not need the wraparound information, it is possible to prevent wasteful transmission of metadata to thereby transmit meta image data more quickly.

Figure 10:
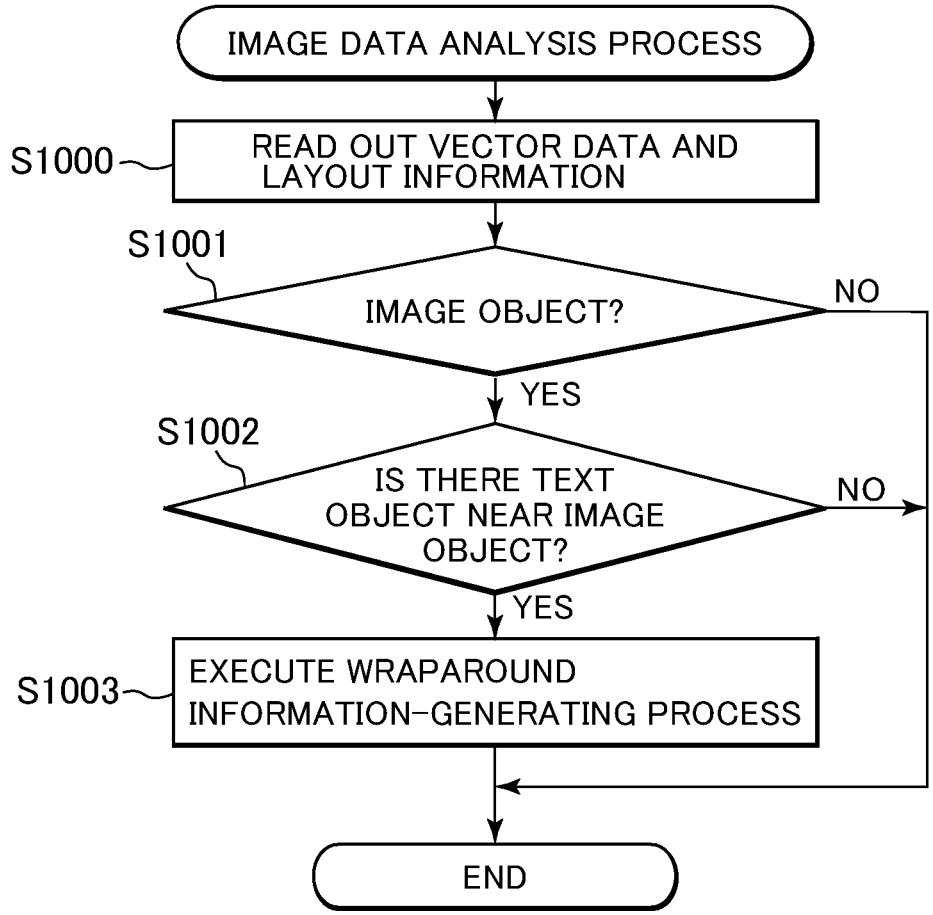
FIG. 10 is a flowchart of a variation of the image data analysis process in FIG. 5.

FIG. 10 is a flowchart of a variation of the image data analysis process in FIG. 5.

As distinct from the FIG. 5 process in which wraparound information is attached to a text object, as metadata, in the FIG. 10 process, keyword information is attached to an image object, as metadata.

Referring to FIG. 10, first, vector data of each object and associated layout information are read out from a vector data file stored in the storage section 111 (step S1000).

Next, it is determined whether or not the read-out vector data is vector data of an image object (step S1001). If the read-out vector data is vector data of an image object, the process proceeds to a step S1002. On the other hand, if the read-out vector data is not vector data an image object, the present process is immediately terminated.

In the step S1002, it is determined whether or not a text object exists in the vicinity of the image object. Specifically, a text object closest in position to the image object is identified based on the layout information read out in the step S1000, and it is determined whether or not the identified text object is within a predetermined distance from the image object. As a result of this determination, if a text object exists in the vicinity of the image object, the process proceeds to a step S1003, whereas if not, the present process is immediately terminated.

In the step S1003, a keyword information-generating process is executed, followed by terminating the present process. Specifically, keyword information is generated as metadata to be attached to the image object with a text object located in the vicinity thereof, and the generated keyword information is stored in the storage section 111 in association with the image object.

The keyword information is used for defining the title of an image object or retrieving an image object, when the image object is reused e.g. by the external apparatus 103. As the keyword information, there is registered data of a character string in the text object.

Figure 11:
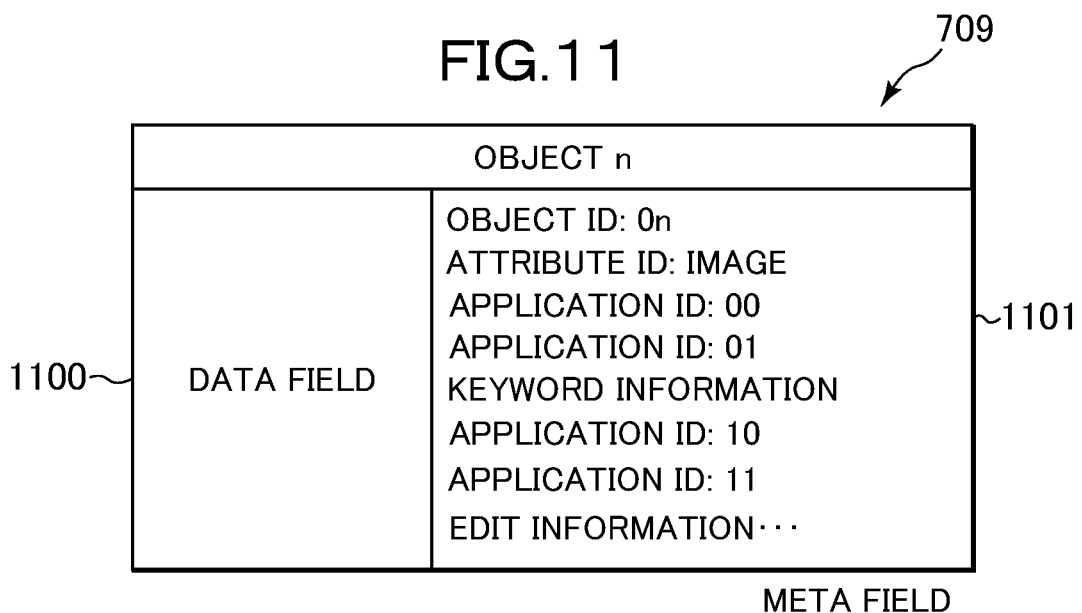
FIG. 11 is a diagram of an example the structure of an object n appearing in FIG. 7.

FIG. 11 is a diagram of the structure of an object n (709) appearing in FIG. 7.

As shown in FIG. 11, the object n (709) is comprised of a data field 1100 and a meta field 1101.

The data field 1100 stores information indicative of the entity of the object n.

The meta field 1101 stores an object ID, an attribute ID indicative of the attribute of the object, application IDs for which associated metadata items are valid, and the metadata items to be applied to respective applications. The metadata items are information, such as keyboard information, associated with the object n (709).

According to the process in FIG. 10, the MFP 100 sends keyword information for an image object to a graphics drawing application assigned an application ID 01 in the transmission destination. The graphics drawing application in the transmission destination can use the received keyword information for defining the title of the image object or retrieving the image object.

Further, since the MFP 100 does not send keyboard information to an application which does not need the keyboard information, it is possible to prevent wasteful transmission of metadata to thereby transmit meta image data more quickly.

It should be noted that spreadsheet title row (column) information may be attached to a table object, as metadata. The spreadsheet title row (column) information is code information indicative of whether or not a cell in an uppermost row (or leftmost column) of a table object contains a title. This information is used in image analysis. When text information in a cell is different from the kind of information in the other cells, more specifically, e.g. when only a cell in the uppermost row contains letters and the other rows contain numerals, it is determined that the uppermost row is a title row.

Although in the present embodiment, metadata items are registered in a meta field in association with respective applications requiring metadata transmission, metadata may be registered in association with a specific person or organization requiring metadata transmission. For example, the image processing apparatus may be configured such that when transmitting meta image data to an organization within one's own company, metadata is also transmitted, but when transmitting meta image data to an external organization, metadata is inhibited from being transmitted.

Further, after checking a security level in a transmission destination through preliminary communication, determination as to whether or not to transmit metadata stored in a meta field may be performed depending on the security level.

Alternatively, determination as to whether or not to transmit metadata stored in a meta field may be performed depending on a geographic region where a transmission destination lies. In this case, for example, 2-byte code (Japanese language) of a text object is sent exclusively to output destinations in Japan.

Further, a plurality of metadata items may be registered in association with each application at the same time.

Furthermore, applications to which metadata is to be transmitted may be narrowed down based on layout information. In this case, for example, a matching pattern associated with the layout information is provided in advance in the data processing section 115, and comparison is performed between the layout information and the matching pattern. Then, only when it is determined by this comparison that the layout information matches the matching pattern, predetermined metadata is sent to a predetermined application.

Any of the processes and functions described above in the present embodiment may be realized using a computer-readable program.

It is to be understood that the present invention may also be accomplished by supplying a system or an apparatus with a storage medium in which a program code of software, which realizes the functions of the above described embodiment, is stored, and causing a computer (or CPU or MPU) of the system or apparatus to read out and execute the program code stored in the storage medium.

In this case, the program code itself read from the storage medium realizes the functions of the above described embodiment, and therefore the program code and the storage medium in which the program code is stored constitute the present invention.

Examples of the storage medium for supplying the program code include a floppy (registered trademark) disk, a hard disk, a magnetic-optical disk, an optical disk, such as a CD-ROM, a CD-R, a CD-RW, a DVD-ROM, a DVD-RAM, a DVD-RW, or a DVD+RW, a magnetic tape, a nonvolatile memory card, and a ROM. Alternatively, the program may be downloaded via a network.

Further, it is to be understood that the functions of the above described embodiment may be accomplished not only by executing the program code read out by a computer, but also by causing an OS (operating system) or the like which operates on the computer to perform a part or all of the actual operations based on instructions of the program code.

Further, it is to be understood that the functions of the above described embodiment may be accomplished by writing a program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

Further, it is to be understood that the functions of the above-described embodiment may be accomplished not only by executing the program code read out by a computer, but also by causing an OS or the like which operates on the computer to perform a part or all of the actual operations based on instructions of the program code. In this case, the program code is supplied directly from a storage medium in which the program code is stored, or is supplied by downloading from another computer, a database, or the like, not shown, connected to the Internet, a commercial network, a local area network, or the like.

While the present invention has been described with reference to an exemplary embodiment, it is to be understood that the invention is not limited to the disclosed exemplary embodiment. The scope of the following claims is to be accorded the broadest interpretation so as to encompass all modifications, equivalent structures and functions.

This application claims priority from Japanese Patent Application No. 2007-323360 filed Dec. 14, 2007, which is hereby incorporated by reference herein in its entirety.

What is claimed is:

1. An image processing apparatus comprising:
an acquisition unit adapted to acquire image data;
a vector data forming unit adapted to convert the image data into vector data;
a generation unit adapted to generate metadata for the image data;
a registration unit adapted to register an output destination to which the generated metadata is to be output; and
an output unit adapted to output the vector data converted by said vector data forming unit to the output destination,
wherein said output unit further outputs the generated metadata when the vector data is output to the registered output destination, and
wherein said vector data forming unit divides the acquired image data into a plurality of objects selected for classification from a category group consisting of a character object, a thin line object, a graphic object, a table object, a natural image object, and a background object, and converts each of the objects into vector data.

2. The image processing apparatus according to claim 1, wherein said vector data forming unit generates layout information indicative of a layout of the objects divided for classification.

3. The image processing apparatus according to claim 1, wherein the metadata is formed by combining a plurality of information items on the objects.

4. The image processing apparatus according to claim 2, wherein said registration unit performs comparison between the layout information generated by said vector data forming unit and a predetermined matching pattern, and registers an output destination to which the metadata is to be output, based on a result of the comparison.

5. A computer-implemented method of controlling an image processing apparatus, the method comprising:
an acquisition step of acquiring image data;
a vector data forming step of converting the image data into vector data;
a generation step of generating metadata for the image data;
a registration step of registering an output destination to which the generated metadata is to be output; and
an output step of outputting the vector data converted by said vector data forming step to the output destination,
wherein said output step further outputs the generated metadata when the vector data is output to the registered output destination, and
wherein said vector data forming step divides the acquired image data into a plurality of objects selected for classification from a category group consisting of a character object, a thin line object, a graphic object, a table object, a natural image object, and a background object, and converts each of the objects into vector data.

6. The computer-implemented method according to claim 5, wherein said vector data forming step generates layout information indicative of a layout of the objects divided for classification.

7. The computer-implemented method according to claim 5, wherein the metadata is formed by combining a plurality of information items on the objects.

8. The computer-implemented method according to claim 6, wherein said registration step performs comparison between the layout information generated by said vector data forming step and a predetermined matching pattern, and registers an output destination to which the metadata is to be output, based on a result of the comparison.

9. A non-transitory computer-readable storage medium storing a program that, when executed by a computer, causes the computer to perform a method of controlling an image processing apparatus, the method comprising:
an acquisition step of acquiring image data;
a vector data forming step of converting the image data into vector data;
a generation step of generating metadata for the image data;
a registration step of registering an output destination to which the generated metadata is to be output; and
an output step of outputting the vector data converted by said vector data forming step to the output destination,
wherein said output step further outputs the generated metadata when the vector data is output to the registered output destination, and
wherein said vector data forming step divides the acquired image data into a plurality of objects selected for classification from a category group consisting of a character object, a thin line object, a graphic object, a table object, a natural image object, and a background object, and converts each of the objects into vector data.

* * * * *